US006378843B1

(12) United States Patent
Hong

(10) Patent No.: US 6,378,843 B1
(45) Date of Patent: Apr. 30, 2002

(54) JACK DEVICE

(76) Inventor: Wen-Cheng Hong, 58, Ma Yuan West St., Taichung (TW)

( * ) Notice: Subject to any disclaimer, the term of this patent is extended or adjusted under 35 U.S.C. 154(b) by 0 days.

(21) Appl. No.: 09/803,682

(22) Filed: Mar. 9, 2001

(51) Int. Cl.[7] .................................................. B60P 1/00

(52) U.S. Cl. .................... 254/2 R; 254/93 R; 254/134; 254/DIG. 16

(58) Field of Search ................................ 254/2 R, 2 B, 254/2 C, 99, 93 R, 93 H, 133, 134, DIG. 16, 8 R, 8 B, 8 C

(56) References Cited

U.S. PATENT DOCUMENTS 3,735,958 A * 5/1973 Hollingsworth ............. 254/2 R
4,715,760 A * 12/1987 Browning ................... 254/134
5,975,496 A * 11/1999 Hong et al. ................. 254/2 R

* cited by examiner

*Primary Examiner*—Robert C. Watson

(57) ABSTRACT

A jack device has a tripod, a pneumatic pressure device disposed on the tripod, an oil pressure device connected to the pneumatic pressure device, and a working table disposed on the oil pressure device. A handle controls the oil pressure device. A first pedal and a second pedal control the pneumatic pressure device.

3 Claims, 7 Drawing Sheets

JACK DEVICE

BACKGROUND OF THE INVENTION

The present invention relates to a jack device. More particularly, the present invention relates to a jack device which has an oil pressure device and a pneumatic pressure device.

A conventional jack often has an oil pressure device such as an oil cylinder. However, the conventional jack does not use a pneumatic pressure device such as a gas cylinder. However, the conventional jack is operated by the oil cylinder slowly.

SUMMARY OF THE INVENTION

An object of the present invention is to provide a jack device which has an oil pressure device and a pneumatic pressure device to be operated easily.

Accordingly, a jack device comprises a tripod, a pneumatic pressure device disposed on the tripod, and an oil pressure device, connected to the pneumatic pressure device. The tripod has an air inlet channel and an air return channel. A first pedal and a second pedal are disposed on the tripod. The pneumatic pressure device has a pneumatic cylinder disposed on the tripod, an air inlet valve connected to the pneumatic cylinder, a cylinder seat disposed in an inner bottom of the pneumatic cylinder, a washer surrounding the cylinder seat, a collar covering the pneumatic cylinder, and a hollow tube, inserted through the pneumatic cylinder and engaged with the cylinder seat. The pneumatic cylinder communicates with the air inlet channel. The oil pressure device has an oil tank inserted in the hollow tube, an oil pipe disposed between the oil tank and the hollow tube, an elongated shaft inserted through the oil tank, a cover seat covering the oil tank and the hollow tube, the cover seat having a through hole and a hollow bottom neck, a connector engaging with the hollow bottom neck, the connector having a round hole, a screw rod, a piston shaft inserted through the screw rod, a driven block connected to the connector and the piston shaft, and a handle connected to the driven block. The cover seat has an oil channel to communicate with the oil pipe. A working table is connected to the elongated shaft.

DETAILED DESCRIPTION OF THE INVENTION

Figure 1:
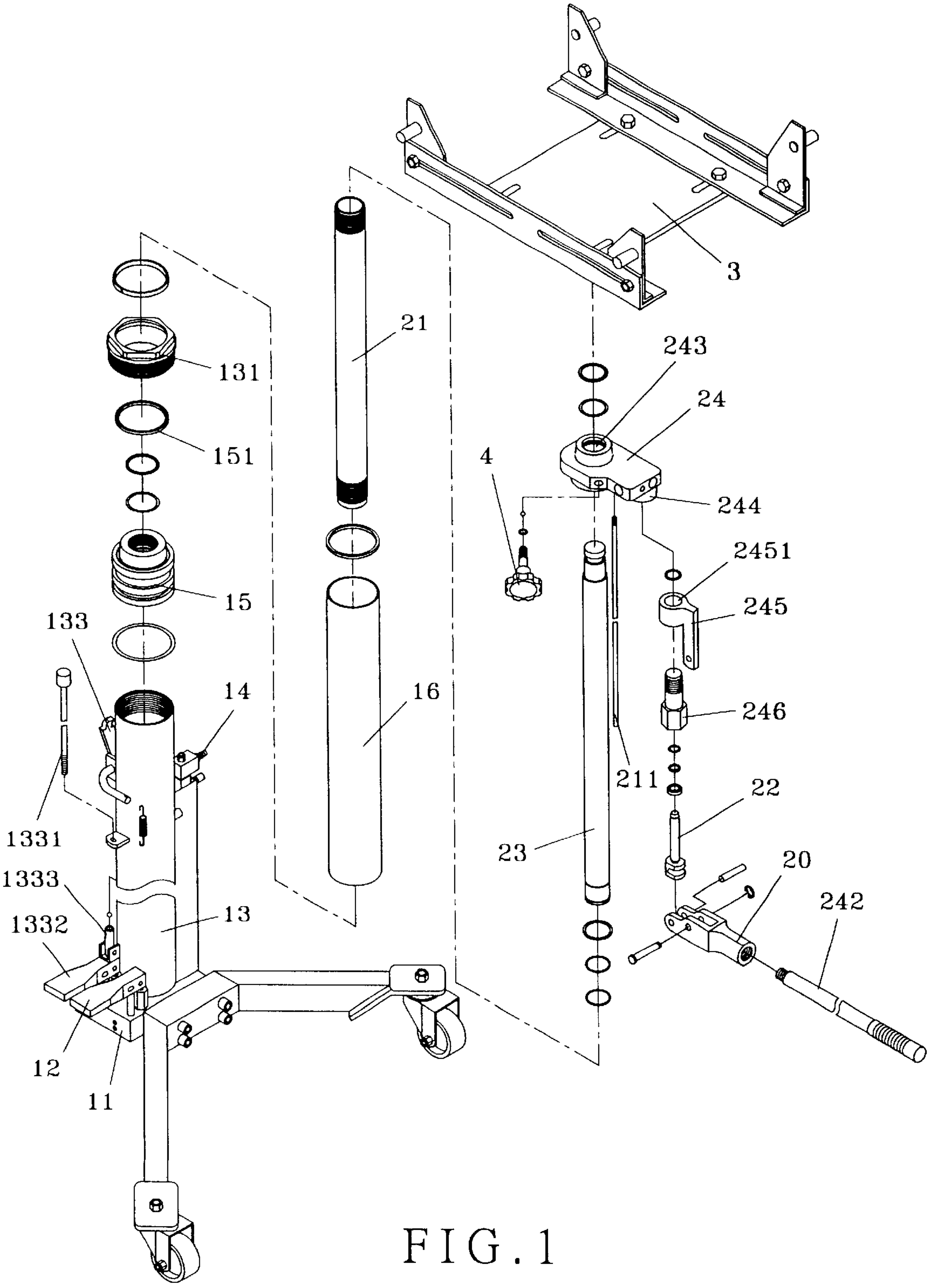
FIG. 1 is a perspective exploded view of a jack device of a preferred embodiment in accordance with the present invention.
Figure 2:
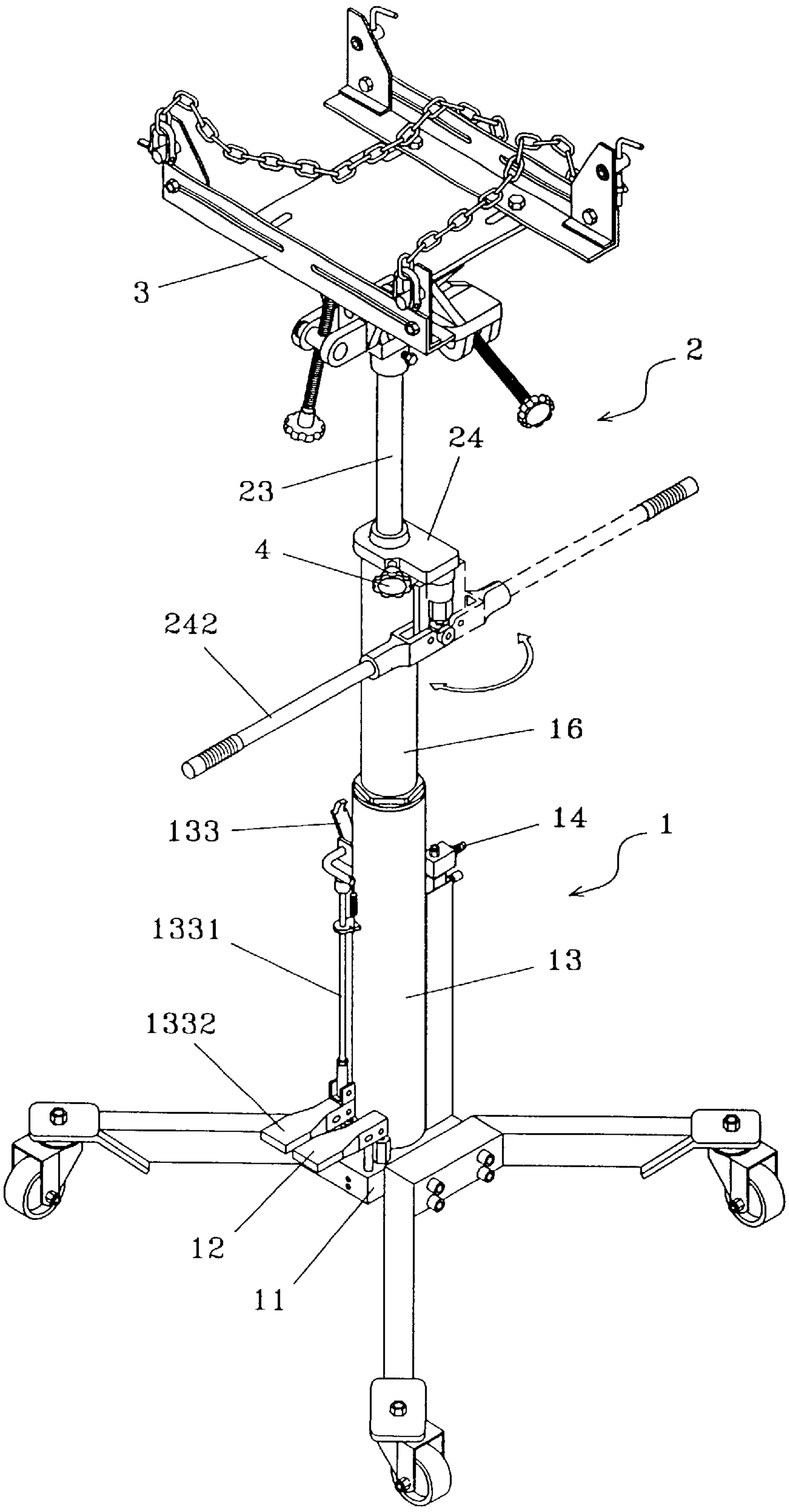
FIG. 2 is a perspective assembly view of a jack device of a preferred embodiment in accordance with the present invention.
Figure 3:
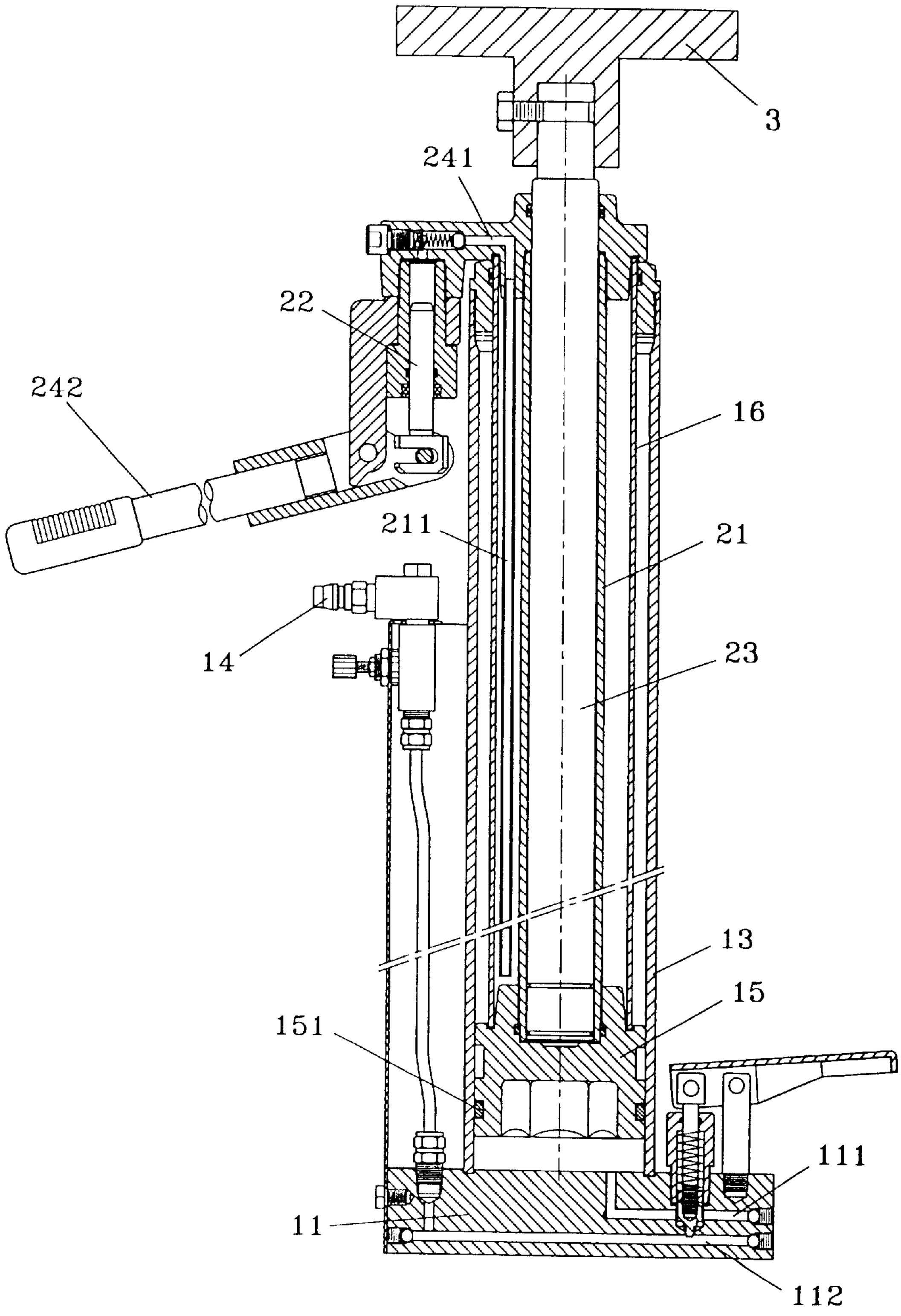
FIG. 3 is a sectional assembly view of a jack device of a preferred embodiment in accordance with the present invention.
Figure 4:
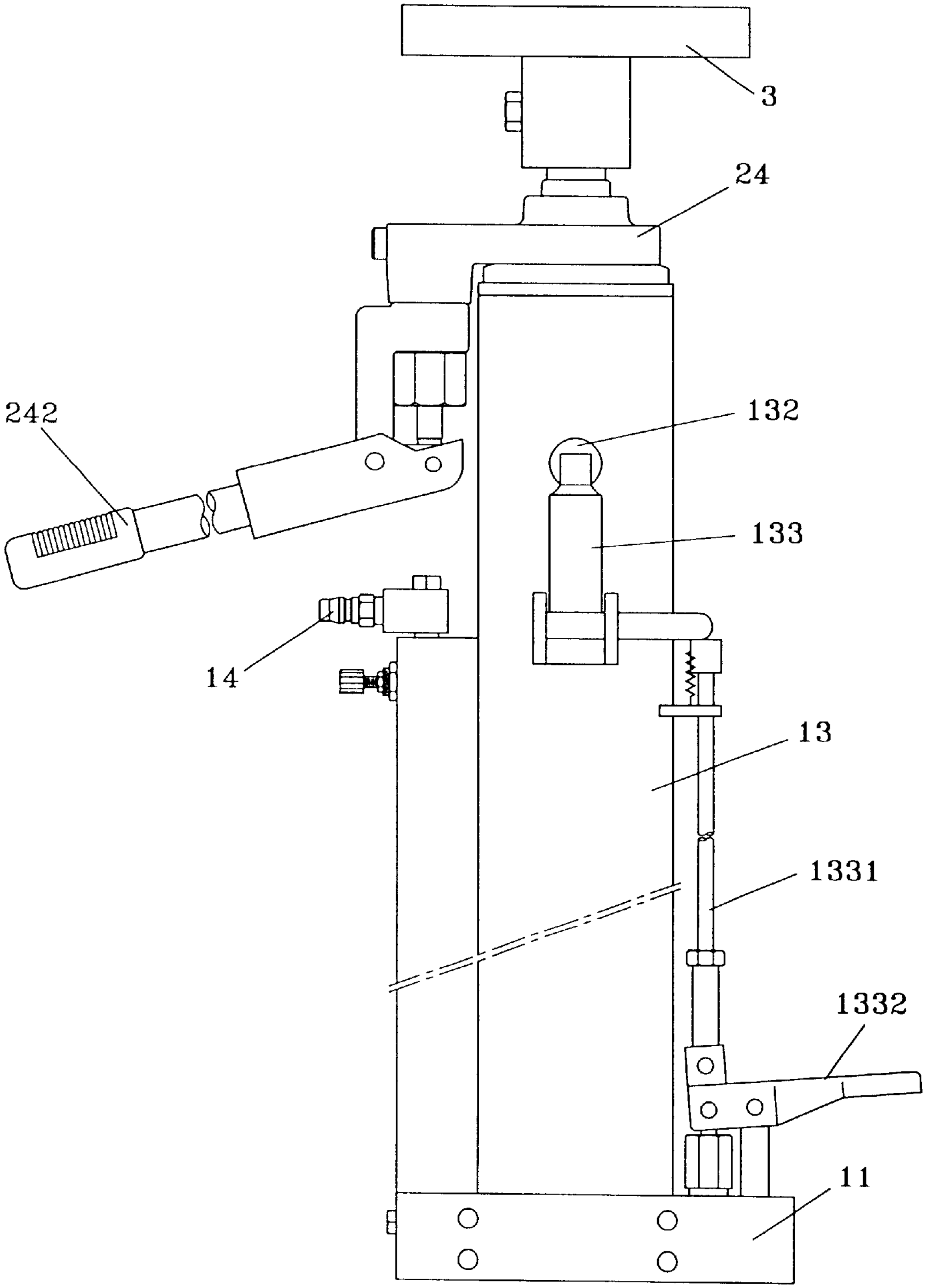
FIG. 4 is an elevational view of a jack device of a preferred embodiment in accordance with the present invention.
Figure 5:
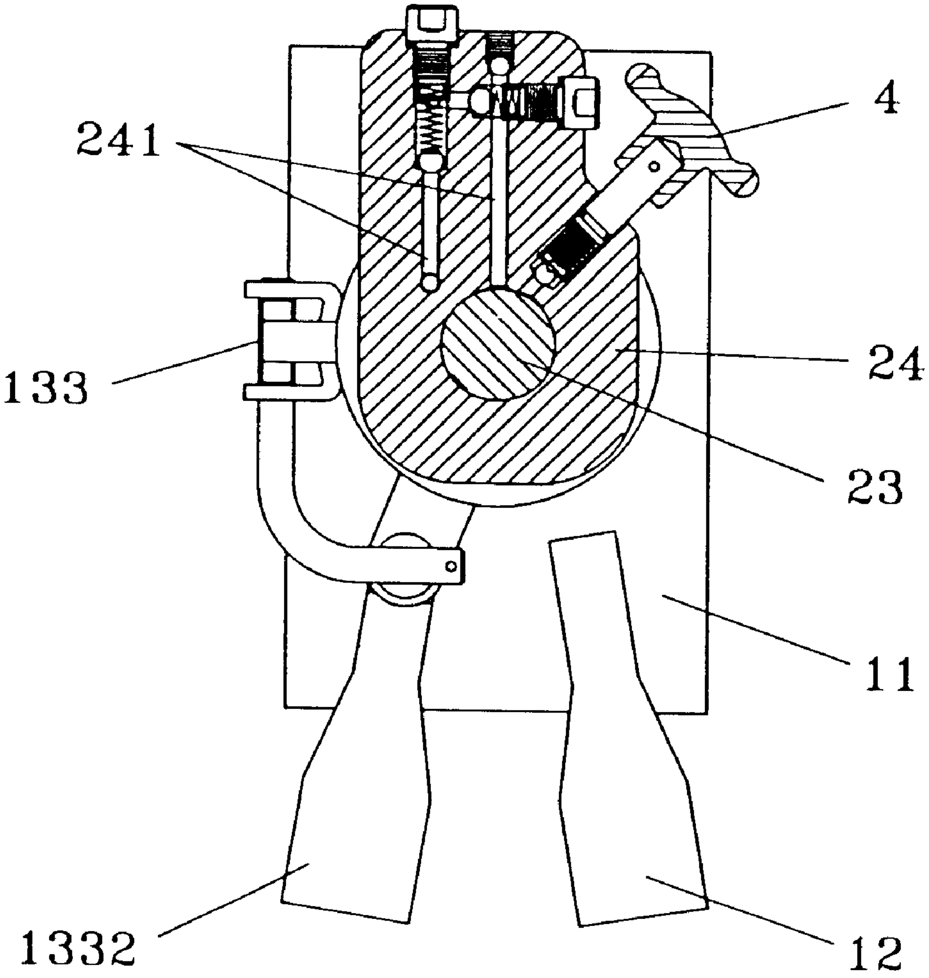
FIG. 5 is a sectional assembly view of a release valve and a cover seat.
Figure 6:
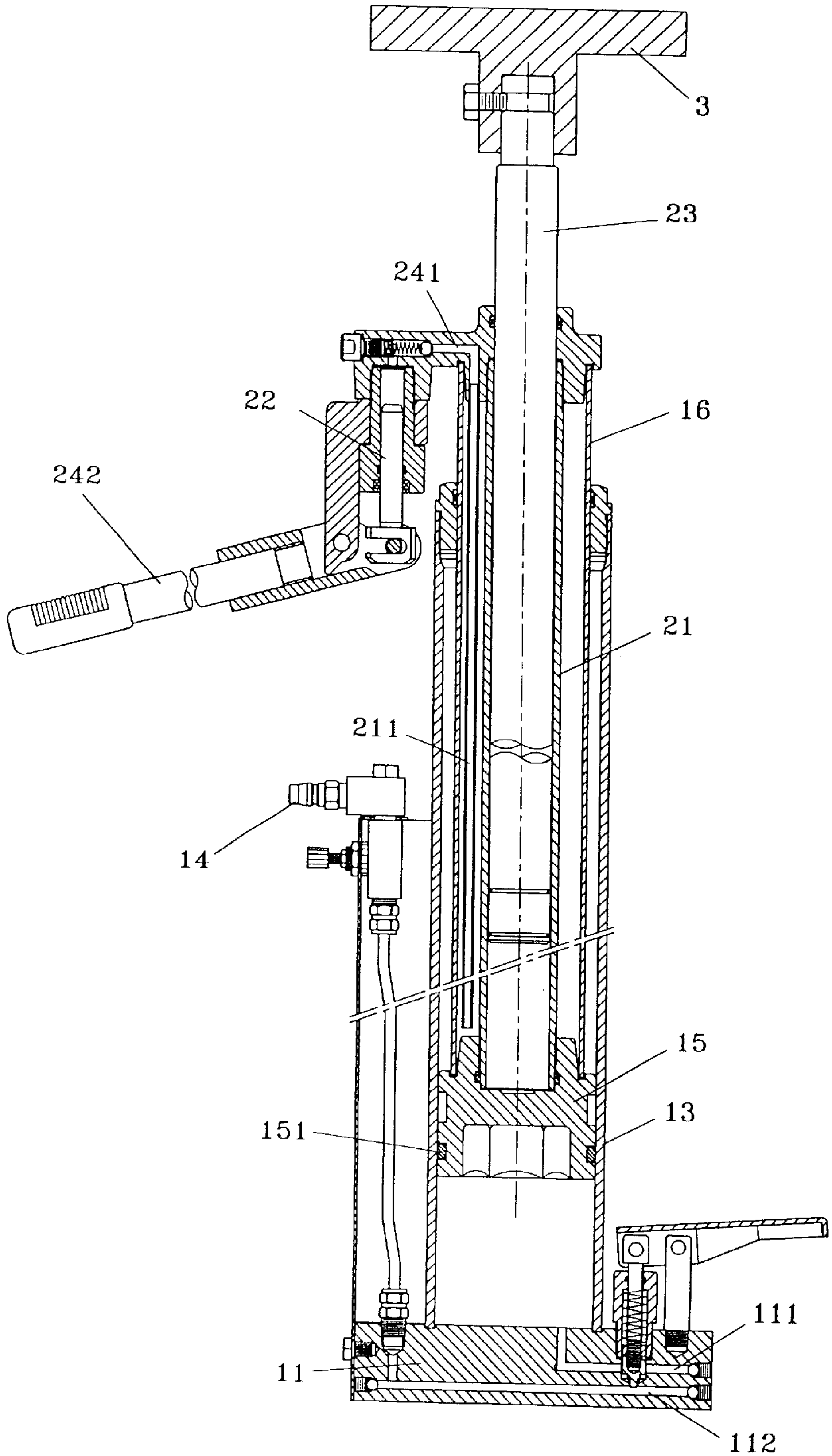
FIG. 6 is another sectional assembly view of a jack device of a preferred embodiment in accordance with the present invention.
Figure 7:
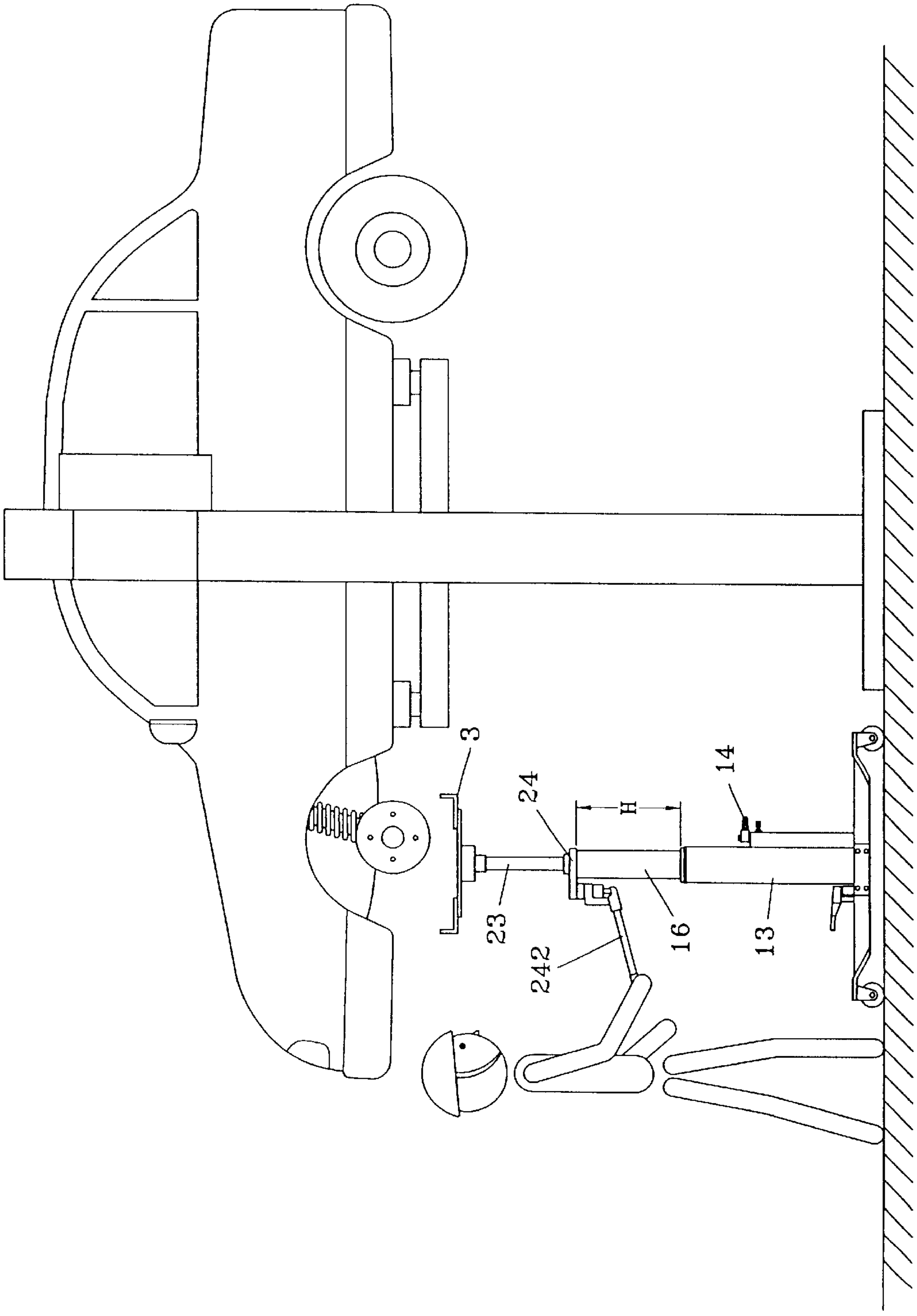
FIG. 7 is a schematic view illustrating an application of a jack device of a preferred embodiment in accordance with the present invention.

Referring to FIGS. 1 to 7, a jack device comprises a tripod 11, a pneumatic pressure device 1 disposed on the tripod 11, an oil pressure device 2 connected to the pneumatic pressure device 1, and a working table 3 disposed on the oil pressure device 2.

The tripod 11 has an air inlet channel 111 and an air return channel 112.

A first pedal 12 and a second pedal 1332 are disposed on the tripod 11. A hollow column 1333 is disposed on the second pedal 1332.

The pneumatic pressure device 1 has a pneumatic cylinder 13 disposed on the tripod 11, an air inlet valve 14 connected to the pneumatic cylinder 13, a cylinder seat 15 disposed in an inner bottom of the pneumatic cylinder 13, a washer 151 surrounding the cylinder seat 15, a collar 131 covering the pneumatic cylinder 13, and a hollow tube 16 inserted through the pneumatic cylinder 13 and engaged with the cylinder seat 15.

A mount 133 is disposed on the pneumatic cylinder 13. An elongated rod 1331 is inserted through the hollow column 1333.

The pneumatic cylinder 13 communicates with the air inlet channel 111.

The oil pressure device 2 has an oil tank 21 inserted in the hollow tube 16, an oil pipe 211 disposed between the oil tank 21 and the hollow tube 16, an elongated shaft 23 inserted through the oil tank 21, a cover seat 24 covering the oil tank 21 and the hollow tube 16, the cover seat 24 having a through hole 243 and a hollow bottom neck 244, a connector 245 engaging with the hollow bottom neck 244, the connector 245 having a round hole 2451, a screw rod 246, a piston shaft 22 inserted through the screw rod 246, a driven block 20 connected to the connector 245 and the piston shaft 22, and a handle 242 connected to the driven block 20.

The cover seat 24 has an oil channel 241 to communicate with the oil pipe 211.

The working table 3 is connected to the elongated shaft 23.

The collar 131 has a vent hole 132.

Referring to FIGS. 1, 2, 6 and 7, the handle 242 controls the oil pressure device 2. The first pedal 12 and the second pedal 1332 control the pneumatic pressure device 1.

When the first pedal 12 is pressed downward, air will enter the air inlet valve 14, the air inlet channel 111, and the pneumatic cylinder 13. Then the cylinder seat 15 moves upward. The handle 242 is operated so that oil in the oil tank 21 flows into the oil pipe 211 and the oil channel 241. The cover seat 24 is lifted upward.

The present invention is not limited to the above embodiment but various modification thereof may be made. Furthermore, various changes in form and detail may be made without departing from the scope of the present invention.

I claim:

1. A jack device comprises:

a tripod, a pneumatic pressure device disposed on the tripod, and an oil pressure device connected to the pneumatic pressure device, the tripod having an air inlet channel and an air return channel, a first pedal and a second pedal disposed on the tripod, the pneumatic pressure device having a pneumatic cylinder disposed on the tripod, an air inlet valve connected to the pneumatic cylinder, a cylinder seat disposed in an inner bottom of the pneumatic cylinder, a washer surrounding the cylinder seat, a collar covering the pneumatic cylinder, and a hollow tube inserted through the pneumatic cylinder and engaged with the cylinder seat, the pneumatic cylinder communicating with the air inlet channel, the oil pressure device having an oil tank inserted in the hollow tube, an oil pipe disposed between the oil tank and the hollow tube, an elongated shaft inserted through the oil tank, a cover seat covering the oil tank and the hollow tube, the cover seat having a through hole and a hollow bottom neck, a connector engaging with the hollow bottom neck, the connector having a round hole, a screw rod, a piston shaft inserted through the screw rod, a driven block connected to the connector and the piston shaft, and a handle connected to the driven block, the cover seat having an oil channel to communicate with the oil pipe, and a working table connected to the elongated shaft.

2. The jack device as claimed in claim 1, wherein a hollow column is disposed on the second pedal.

3. The jack device as claimed in claim 2, wherein a mount is disposed on the pneumatic cylinder, and an elongated rod is inserted through the hollow column.

* * * * *